Aug. 30, 1966   M. B. HOLLANDER   3,269,001
FRICTION WELDING
Filed July 10, 1963
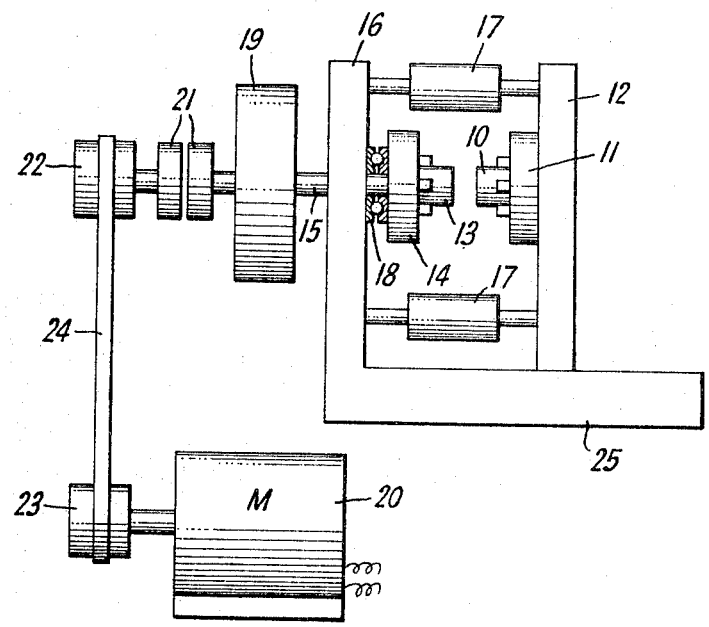
INVENTOR
MILTON BERNARD HOLLANDER
BY
ATTORNEY

United States Patent Office 3,269,001
Patented August 30, 1966

3,269,001
FRICTION WELDING
Milton Bernard Hollander, Stamford, Conn., assignor to American Machine & Foundry Company, a corporation of New Jersey
Filed July 10, 1963, Ser. No. 294,105
3 Claims. (Cl. 29—470.3)

This application is a continuation-in-part of my co-pending application Serial No. 206,714, filed July 2, 1962. This invention relates in general to friction welding, and, more particularly, to the friction welding of aluminum workpieces to steel workpieces. Here aluminum includes pure aluminum as well as aluminum alloys.

Aluminum may be friction welded to stainless, alloy and carbon steel and to other ferrous alloys using an inertia friction welding apparatus. Elements fabricated by friction welding aluminum workpieces to steel workpieces may range from steel pot covers with aluminum handles to complex aircraft parts.

A main object of this invention is to friction weld aluminum to steel and other ferrous alloys. This and other objects, advantages and features of invention will become apparent from the following description and accompanying drawing wherein:

The figure is a schematic drawing of an inertia friction welding apparatus.

Referring to the drawing in detail, the figure shows a flywheel or inertia friction welding apparatus in which a first steel workpiece 10, which may be a AISI 4140 alloy steel, a type 304 stainless steel, a 1018 carbon steel, a cast iron, or other like ferrous alloy, is held in the stationary chuck 11 fixed to a vertical frame member 12 slidably mounted on a base 25. An aluminum workpiece 13 is placed in a rotatably mounted chuck 14 fixed to shaft 15 which passes through the stationary vertical frame member 16. Of course, the workpieces can be interchanged. Hydraulic cylinders 17 are connected between the members 12 and 16 to draw them toward each other. A thrust bearing 18 takes up the axial load from the rotating chuck 14. A flywheel 19 is fixed on shaft 15 which is driven by a motor 20 through a clutch 21 by means of pulleys 22 and 23 and a belt 24.

To friction weld aluminum and steel workpieces 10 and 13, about 6,500 foot pounds of energy should be delivered to the weld area for each square inch of weld area for butt welding. To weld stud to plate of these material combinations, 2 to 3 times of this energy may be required. This energy may be delivered in less than ten seconds, preferably in two seconds or less. If the energy is delivered for more than ten seconds, softer material, in this case aluminum, will flow excessively and a poor weld will result. Also, the atmosphere may contaminate the aluminum at the weld.

Since an inertia friction welding apparatus completes a weld much faster and yields equal or better quality than conventional friction welding apparatus, the weld of this invention is best and most easily made using an inertia friction welding apparatus.

For best results the average relative surface speed of the workpieces prior to forcing the workpieces together should be at least four feet per second to forestall chattering and galling.

To make the weld, the workpieces should be forced together with a pressure of from 5,000 to 40,000 pounds per square inch of weld area. Excellent welds have been obtained with a weld pressure of from 15,000 to 30,000 pounds per square inch.

Welds can be made with the energy put into the welds varying from 3,000 to 30,000 foot pounds per square inch of weld area, but the greater amount of energy may produce an excessive amount of upset for some applications.

The forementioned limits substantially hold true for friction welds from $\frac{1}{100}$ square inches in weld area to over 10 square inches in weld area.

While this invention has been shown and described in the best forms known, it will nevertheless be understood that these are purely exemplary and that modifications may be made without departing from the spirit and scope of the invention except as it may be more limited in the appended claims.

What is claimed is:

1. The method of friction welding aluminum and ferrous alloy workpieces comprising the steps of imparting rotation to one workpiece coupled to a flywheel to store sufficient energy to be delivered to the weld area as welding heat, and then forcing the workpieces together with a force of over 5,000 pounds per square inch of weld area to decelerate the rotating workpiece and complete the weld within ten seconds as the rotating workpiece and the flywheel deliver between about 3,000 and about 30,000 foot pounds of energy per square inch of the weld area.

2. The method according to claim 1 in which an average relative surface speed of four feet per second is attained prior to forcing the workpieces together.

3. The method of friction welding aluminum and ferrous alloy workpieces comprising the steps of imparting rotation to one workpiece and then forcing the workpieces together with a force of over 5,000 pounds per square inch of weld area and decelerating the rotating workpiece to complete the weld within ten seconds as the rotating workpiece delivers between about 3,000 and about 30,000 foot pounds of energy per square inch to the weld area.

References Cited by the Examiner
UNITED STATES PATENTS

| | | | |
|---|---|---|---|
| 3,134,169 | 5/1964 | Hollander et al. | 29—470.3 |
| 3,134,278 | 5/1964 | Hollander et al. | 29—470.3 |
| 3,175,284 | 3/1965 | Cotovsky | 29—470.3 |

JOHN F. CAMPBELL, *Primary Examiner.*